(12) United States Patent
Lee et al.

(10) Patent No.: US 11,938,890 B2
(45) Date of Patent: Mar. 26, 2024

(54) CUSHION FOR PEDESTRIAN AIRBAG

(71) Applicant: HYUNDAI MOBIS CO., LTD., Seoul (KR)

(72) Inventors: Seok Min Lee, Yongin-si (KR); Seok Hoon Ko, Yongin-si (KR); Kyu Sang Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/396,634

(22) Filed: Aug. 6, 2021

(65) Prior Publication Data

US 2022/0371541 A1   Nov. 24, 2022

(30) Foreign Application Priority Data

May 24, 2021  (KR) .................. 10-2021-0066248

(51) Int. Cl.
*B60R 21/36* (2011.01)
*B60R 21/34* (2011.01)

(52) U.S. Cl.
CPC .............. *B60R 21/36* (2013.01); *B60R 21/34* (2013.01)

(58) Field of Classification Search
CPC ................................. B60R 21/34; B60R 21/36
See application file for complete search history.

(56) References Cited

U.S. PATENT DOCUMENTS

| | | | | |
|---|---|---|---|---|
| 5,829,779 A * | 11/1998 | Nakashima | ........... | B60R 21/239 280/730.2 |
| 7,828,106 B1 * | 11/2010 | Ratajski | ................. | B60R 21/13 296/210 |
| 9,463,769 B2 * | 10/2016 | Park | ........................ | B60R 21/36 |
| 9,511,740 B2 * | 12/2016 | Park | .................... | B60R 21/2338 |
| 2006/0157958 A1 * | 7/2006 | Heudorfer | ........... | B60R 21/2338 280/730.2 |
| 2006/0201731 A1 * | 9/2006 | Nakamura | .............. | B60R 21/36 180/274 |
| 2007/0112513 A1 * | 5/2007 | Mathevon | ........... | B60R 21/0136 701/96 |
| 2008/0265554 A1 * | 10/2008 | Nakamura | ............ | B60R 21/201 280/743.1 |
| 2010/0148476 A1 * | 6/2010 | Inoue | ..................... | B60R 21/36 280/728.2 |
| 2010/0252350 A1 * | 10/2010 | Hayashi | ................. | B60R 21/36 180/274 |

(Continued)

FOREIGN PATENT DOCUMENTS

| | | | | |
|---|---|---|---|---|
| DE | | 197 45 873 | 4/1999 | |
| DE | | 19803165 A1 * | 7/1999 | ............ B60R 21/36 |

(Continued)

OTHER PUBLICATIONS

German Office Action dated Oct. 14, 2021 issued in DE 10 2021 123 602.9.

(Continued)

*Primary Examiner* — Barry Gooden, Jr.
(74) *Attorney, Agent, or Firm* — DLA Piper LLP (US)

(57) ABSTRACT

A pedestrian airbag includes: an airbag cushion stored in a pedestrian airbag room located between a roof and a headliner of a vehicle in a folded state, and configured to be deployed to cover both a windshield glass and an A-pillar by being expanded during deployment thereof; and an inflator configured to supply gas to the airbag cushion.

7 Claims, 5 Drawing Sheets

(56) References Cited

U.S. PATENT DOCUMENTS

| | | | | |
|---|---|---|---|---|
| 2013/0119644 A1* | 5/2013 | Rick | ................ | B60R 21/36 280/728.2 |
| 2014/0332305 A1* | 11/2014 | Thomas | ................ | B60K 28/10 180/274 |
| 2015/0107928 A1* | 4/2015 | Mazanek | ................ | B60R 21/36 180/274 |
| 2016/0264093 A1* | 9/2016 | Suemune | ................ | B60R 21/36 |
| 2016/0264094 A1* | 9/2016 | Suemune | ................ | B60R 21/36 |
| 2018/0099639 A1* | 4/2018 | Suemune | ................ | B60R 21/36 |
| 2019/0071050 A1* | 3/2019 | Farooq | ................ | B60R 21/36 |
| 2019/0375368 A1* | 12/2019 | Kanno | ................ | B60R 21/233 |
| 2020/0101918 A1* | 4/2020 | Nagasawa | ................ | B60R 21/36 |
| 2020/0269802 A1* | 8/2020 | Clauss | ................ | B60R 21/36 |

FOREIGN PATENT DOCUMENTS

| | | | | |
|---|---|---|---|---|
| DE | 100 59 223 | | 7/2002 | |
| DE | 10059207 A1 * | | 7/2002 | ............ B60R 21/36 |
| DE | 603 03 225 | | 9/2006 | |
| DE | 102005048627 A1 * | | 5/2007 | ............ B60R 21/36 |
| DE | 20 2007 003 212 | | 7/2007 | |
| DE | 10 2006 042 375 | | 3/2008 | |
| DE | 10 2014 007 541 | | 12/2014 | |
| DE | 10 2020 106 388 | | 9/2021 | |
| EP | 2617608 A1 * | 7/2013 | ............ B60R 21/36 |
| JP | 07156749 A * | 6/1995 | ............ B60R 21/36 |
| JP | 2004-082804 | 3/2004 | |
| JP | 2004330825 A * | 11/2004 | ........... B60R 19/483 |
| JP | 2006-044289 | 2/2006 | |
| JP | 2006-044569 | 2/2006 | |
| JP | 2006-298154 | 11/2006 | |
| JP | 2008285109 A * | 11/2008 | ............ B60R 21/36 |
| JP | 2008285110 A * | 11/2008 | ............ B60R 21/36 |
| JP | 2009143359 A * | 7/2009 | ............ B60R 21/36 |
| JP | 2009143552 A * | 7/2009 | ............ B60R 21/36 |
| JP | 2009184490 A * | 8/2009 | ............ B60R 21/36 |
| JP | 2009208761 A * | 9/2009 | ............ B60R 21/36 |
| KR | 10-2016-0043274 | 4/2016 | |

OTHER PUBLICATIONS

Korean Office Action dated Jan. 5, 2023 issued in KR 10-2021-0066248.

English Language Abstract of JP 2004-082804 published Mar. 18, 2004.

English Language Abstract of JP 2006-044289 published Feb. 16, 2006.

English Language Abstract of JP 2006-298154 published Nov. 2, 2006.

* cited by examiner

<Front view of airbag cushion
after deployment of airbag cushion>

A-pillar     windshield glass     A-pillar

<Sectional view of airbag cushion
after deployment of cushion>

CUSHION FOR PEDESTRIAN AIRBAG

CROSS REFERENCE TO RELATED APPLICATION

The present application claims priority to Korean Patent Application No. 10-2021-0066248, filed May 24, 2021, the entire contents of which is incorporated herein for all purposes by this reference.

BACKGROUND OF THE INVENTION

Field of the Invention

The present invention relates generally to a cushion for a pedestrian airbag deployed from a vehicle and, more particularly, to a cushion for a pedestrian airbag, wherein the cushion mounted in a portion around a roof of a vehicle is deployed downward during a collision.

Description of the Related Art

A pedestrian airbag is an airbag provided to protect a pedestrian during a collision between a vehicle and the pedestrian. When the vehicle and an object collide with each other, a sensor mounted in the pedestrian airbag detects an object that collided with the vehicle, and when the object is recognized as a pedestrian, a pedestrian airbag controller controls deployment of the pedestrian airbag so that the airbag serves to prevent the head of the pedestrian from hitting a lower portion of a windshield or an A-pillar.

A conventional pedestrian airbag is located between a bonnet and a windshield glass in order to respond quickly during a collision between the pedestrian and the vehicle, and an area covered by the pedestrian airbag is a lower portion of the windshield glass and a portion of the A-pillar.

When the pedestrian airbag is located between the bonnet and the windshield glass of the vehicle, a housing of the pedestrian airbag is melted by heat of a heated engine room, so a cost for providing a separate structure to prevent a damage due to heat of the engine room is increased in order to mount the pedestrian airbag in the engine room.

In addition, in a case of a future vehicle such as an electric vehicle or an autonomous vehicle that has a short front surface as an aspect of design, the probability that the pedestrian collides with the windshield glass and an upper portion of A-pillar is increased when a collision occurs. With the number of people who used bicycles increasing, there is a need to prepare for a collision on a front upper portion of the vehicle.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to a pedestrian airbag that is provided in a space located between a roof and a headliner of a vehicle and is capable of protecting a pedestrian by covering both a windshield screen front surface and an A-pillar front surface of the vehicle during a collision with the pedestrian.

In order to achieve the above object, the pedestrian airbag according to the present invention includes: an airbag cushion stored in a pedestrian airbag room located between a roof and a headliner of a vehicle in a folded state, and configured to be deployed to entirely cover both a windshield glass and an A-pillar by being expanded downward during deployment thereof; and an inflator configured to supply gas to the airbag cushion.

The airbag cushion may be configured such that a portion thereof corresponding to the windshield glass may constitute a windshield glass chamber and a portion thereof corresponding to the A-pillar may constitute an A-pillar chamber, and thicknesses of the windshield glass chamber and the A-pillar chamber may be different from each other.

The thickness of the A-pillar chamber may be thicker than the thickness of the windshield glass chamber.

The airbag cushion may be stored in a roll-folding method in which the airbag cushion may be rolled in a direction toward the windshield glass.

The airbag cushion may be stored such that a portion thereof may be rolled in a roll-folding method in a direction toward the windshield glass and a remaining portion thereof may be folded in a zigzag-folding method.

A cover may be provided at the roof, the cover being configured to cover the folded airbag cushion and to guide a deployment direction of the airbag cushion during the deployment of the airbag cushion.

The cover may be coupled by hinging at a portion where the roof extended forward is bent.

A diffuser may be provided at an upper portion of the airbag cushion, and have an inlet connected to the inflator and outlets communicating with the inside of the airbag cushion, the outlets of the diffuser being arranged to face opposite sides of the airbag cushion.

The diffuser may be provided at a center portion of the upper portion of the airbag cushion.

According to the present invention, the pedestrian airbag have the following advantageous.

The pedestrian airbag is expanded from the roof, and a heat damageable structure that may be damaged from an engine room is unnecessary, so the airbag does not need a separate hood lifter provided to lift a bonnet hood and thus reduces a manufacturing cost of the vehicle.

The pedestrian airbag can cover both the windshield glass and the A-pillar by having enlarged protection area, so the pedestrian airbag has higher safety than a conventional airbag in an aspect of protecting a pedestrian.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Hereinbelow, a detailed description for solving the above-described objective and problems will be described in detail with reference to the accompanying drawings. Meanwhile, in the following description of the present invention, detailed descriptions of known functions and components incorporated herein will be omitted when it may make the subject matter of the present invention unclear. The scope and spirit of the present invention are not limited to the embodiment described hereinbelow and those skilled in the art will appreciate that various modifications, additions and substitutions are.

Figure 1:
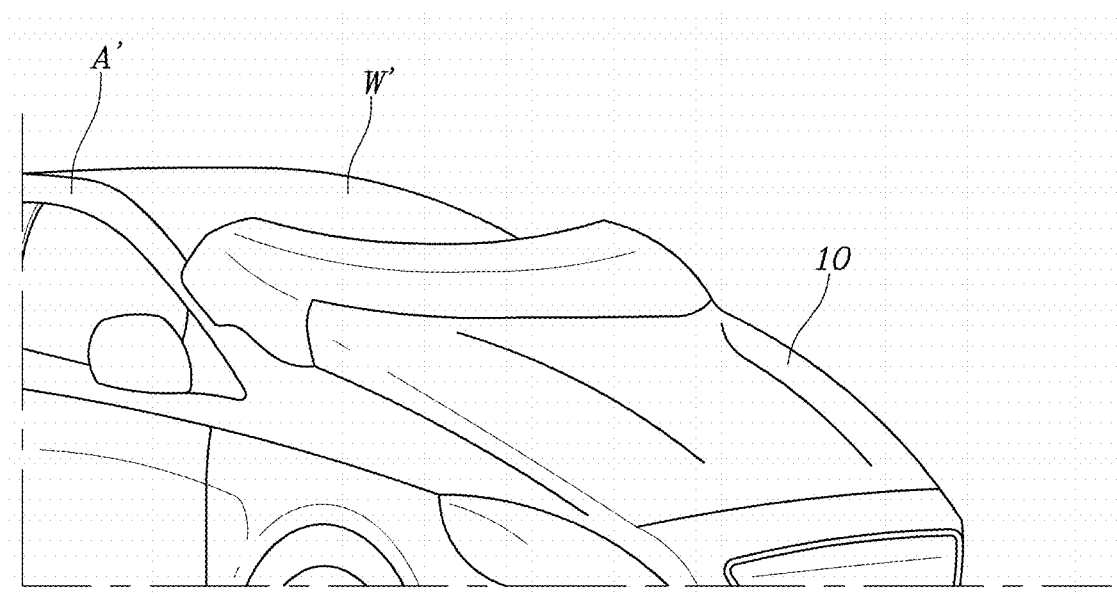
FIG. 1 is a view showing a conventional pedestrian airbag.

FIG. 1 is a view showing a conventional pedestrian airbag. Referring to FIG. 1, the conventional pedestrian airbag is mounted in a bonnet hood 10 located at the front of a vehicle. An engine roof is located in the hood 10, so a housing of the pedestrian airbag mounted in the hood 10 is melted by heat of the engine room thus causing a functional error. Accordingly, in order to protect the airbag housing, a structure preventing damage caused by heat of the engine room should be provided, so there is a problem that a cost for mounting the pedestrian airbag is increased.

When the pedestrian airbag is operated, a speed of deploying the airbag is slow in a case in which the hood 10 is lifted by an expansive pressure of the airbag. Therefore, the airbag needs a separate lifter provided for lifting the hood, thereby causing a problem that a cost for mounting the pedestrian airbag has been increased.

With increasing people who use bicycles as a means of transportation or exercise, a need to protect a higher and larger area than an area protected by the conventional pedestrian airbag is increased.

In a case of an electric vehicle or an autonomous vehicle that has a short front surface as an aspect of design, the probability of a pedestrian collision on an upper portion A' of an A-pillar and an upper portion W' of a front windshield glass beyond the existing protection area is greater than the probability of a conventional general vehicle, so a need to protect a larger area than an area protected by the conventional airbag has been increased.

Figure 2:
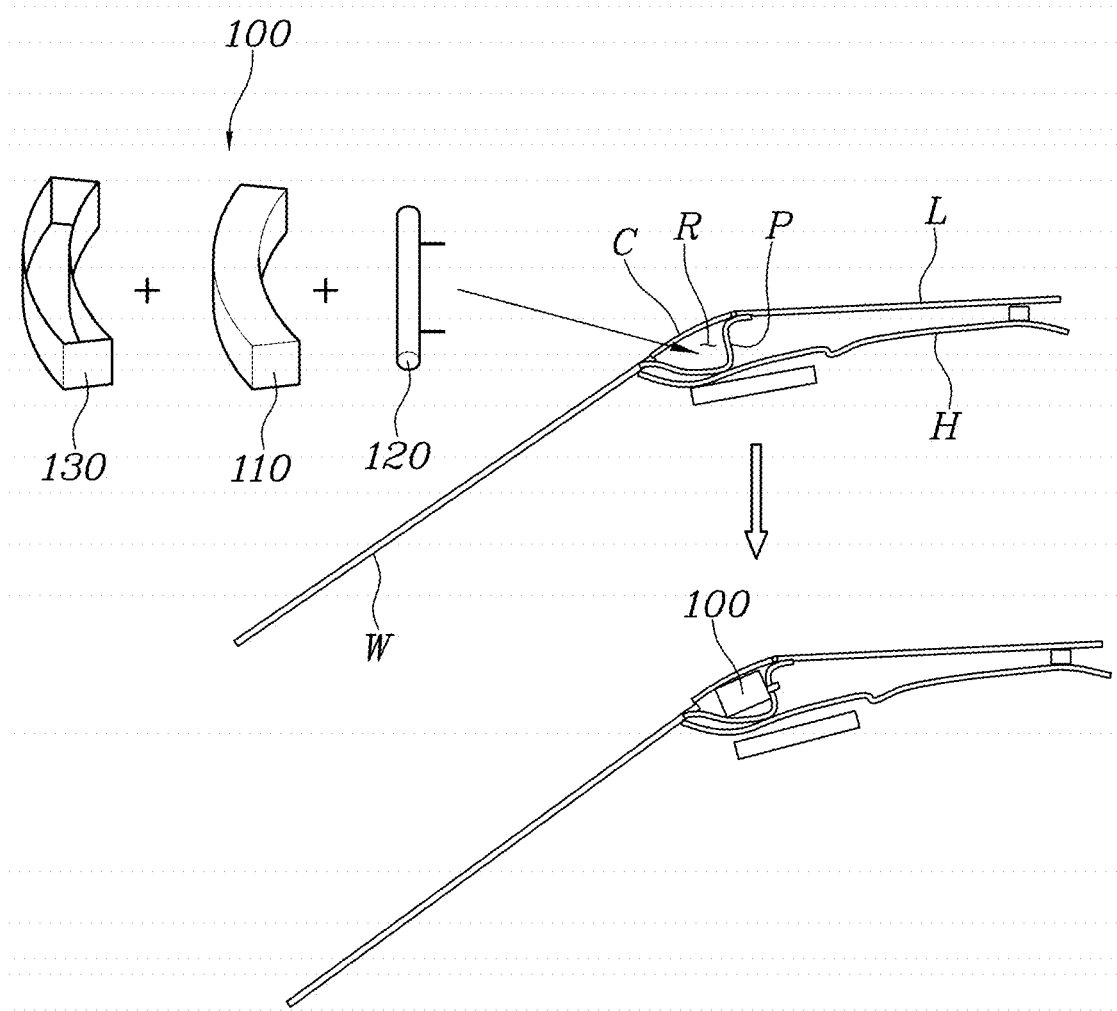
FIG. 2 is a view showing a structure and an installation location of a pedestrian airbag according to an embodiment of the present invention.

According to the embodiment in order to achieve the above objectives, referring to FIG. 2, a pedestrian airbag 100 includes: an airbag cushion 110 stored in a pedestrian airbag room R located between a roof L and a headliner H of a vehicle, and deployed to entirely cover both a windshield glass W and an A-pillar A by being expanded downward during deployment thereof; and an inflator 120 configured to supply gas to the airbag cushion 110.

In addition, the pedestrian airbag may include an airbag housing 130 to cover the airbag cushion 110, and the airbag housing covering the airbag cushion 110 may be provided in the pedestrian airbag room.

The airbag housing 130, the airbag cushion 110, and the inflator 120 constitute an airbag module and the airbag module may be provided in the pedestrian airbag room R.

The pedestrian airbag 100 according to the present invention is provided in the pedestrian airbag room R located between the roof L and the headliner H of the vehicle. Accordingly, it is possible to remove a structural body provided to prevent damage due to heat of an engine room or a lifter provided to lift a bonnet hood that should be provided in the conventional pedestrian airbag, and a cost required for mounting the pedestrian airbag may be reduced.

Meanwhile, a front panel P is positioned between the roof L and the headliner H on an upper portion of the vehicle to support the roof L. The inside of the front panel P is empty, so the pedestrian airbag room R is provided in the empty inside space of the front panel P to install the pedestrian airbag 100 therein.

A cover C may be coupled by hinging at a portion where the roof L of the vehicle extended forward is bent. While the cover C is lifted by expansive force of the airbag cushion 110 when the airbag cushion 110 is expanded, the pedestrian airbag room R is opened. The cover C may serve to guide the airbag cushion 110 so that the airbag cushion 110 is deployed downward rather than upward.

Figure 3:
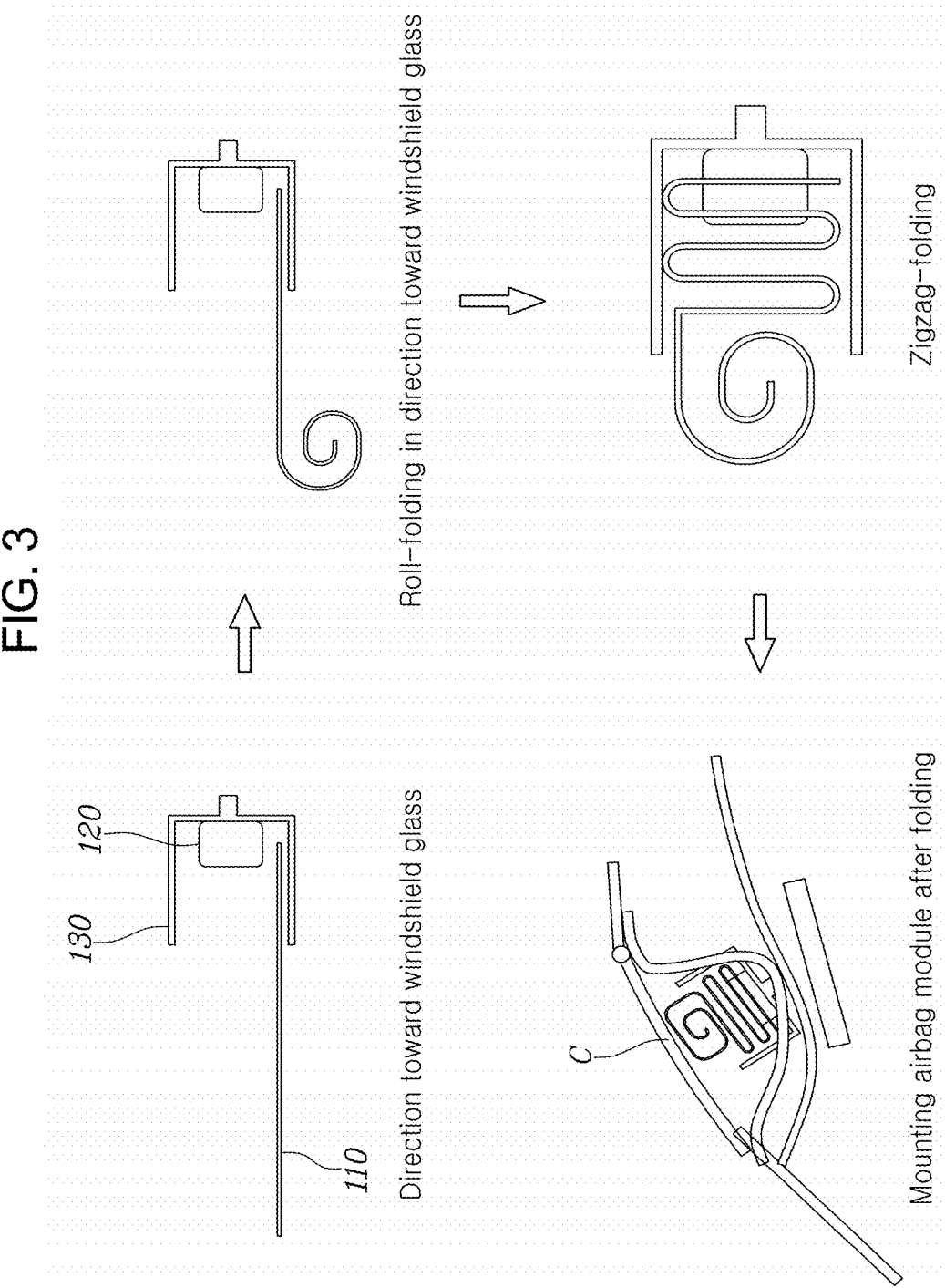
FIG. 3 is a view showing an airbag cushion folding method of the pedestrian airbag according to the embodiment of the present invention.

Referring to FIG. 3, the airbag cushion 110 may be stored in a roll-folding method by being rolled in a direction toward the windshield glass. Alternately, a portion of the airbag cushion 110 may be rolled in the direction toward the windshield glass and a remaining portion thereof may be folded in a zigzag-folding method.

However, when the airbag cushion 110 is folded by being rolled in a direction toward the roof rather than the direction toward the windshield glass, a pedestrian may not be protected due to the airbag cushion 110 expanded upward while facing the sky. Therefore, the airbag cushion 110 may be stored such that the entire airbag cushion is folded by being rolled in the direction toward the windshield glass, or a portion thereof is rolled in the roll-folding method in the direction toward the windshield glass and a remaining portion thereof is folded in the zigzag-folding method. When an airbag cushion located close to an inflator is folded in the zigzag-folding method, the airbag cushion may initially perform rapid deployment, so that it is preferable to roll-fold a portion of the airbag cushion and to fold a remaining portion thereof in the zigzag-folding method, rather than rolling the entire airbag cushion.

Figure 4:
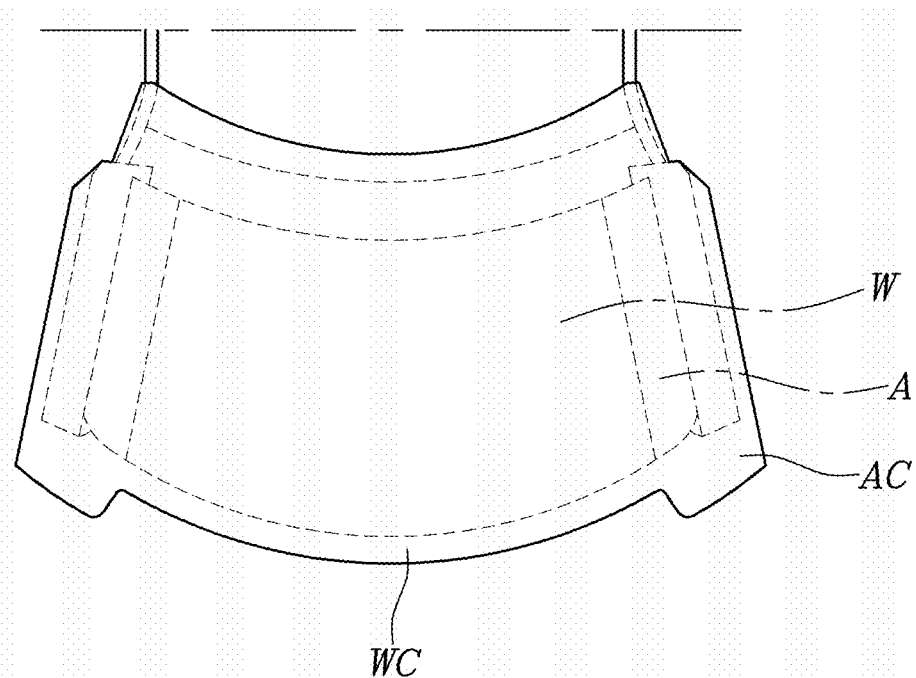
FIG. 4 is a view showing a deployed structure of the pedestrian airbag according to the embodiment of the present invention.
Figure 4:
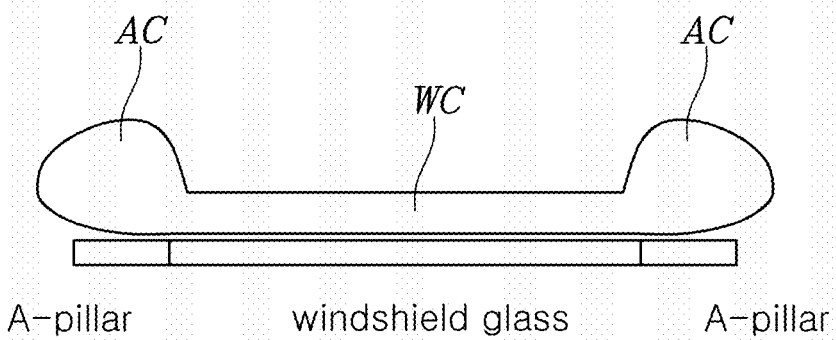

Referring to FIG. 4, the airbag cushion is configured such that a portion thereof corresponding to the windshield glass W constitutes a windshield glass chamber WC and a portion thereof corresponding to the A-pillar A constitutes an A-pillar chamber AC. The windshield glass chamber AC may have a thickness different from a thickness of the A-pillar chamber AC, and the thickness of the A-pillar chamber AC may be thicker than the thickness of the windshield glass chamber.

Specifically, when the airbag cushion 110 is expanded, the airbag cushion 110 is expanded to cover both the windshield glass W and the A-pillar A, so when a pedestrian collides with the vehicle, it is possible to maximally prevent the pedestrian from being injured by hitting upper portions of the windshield glass W and the A-pillar A as much as possible. Since the airbag cushion 110 is expanded downward, there is a risk that the pedestrian hits lower portions of the windshield glass W and the A-pillar A. However, an expansive speed of the airbag cushion 110 may be controlled to cover a front surface of the windshield glass W or the A-pillar A before the pedestrian hits the lower portion of the windshield glass W or the A-pillar A, so the problem does not much matter.

Figure 5:
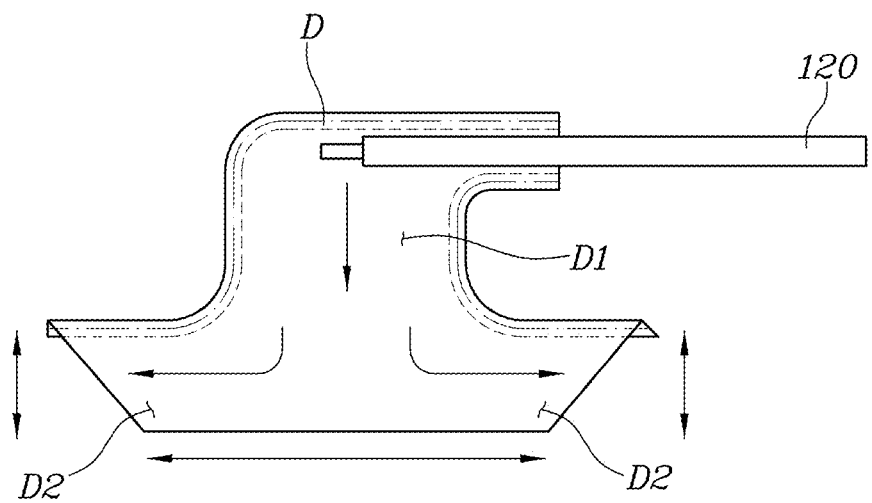
FIG. 5 is a view showing a diffuser of the pedestrian airbag according to the embodiment of the present invention.
Figure 5:
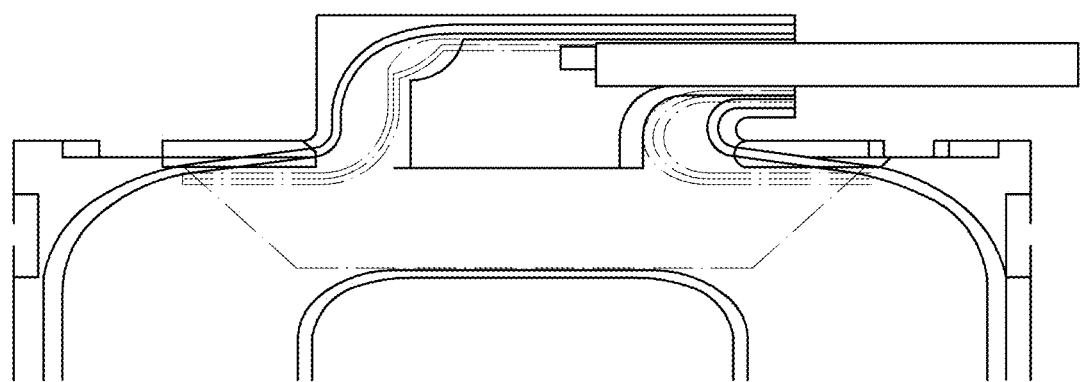

Referring to FIG. 5, a diffuser D is provided at an upper portion of the airbag cushion 110, has an inlet D1 of the diffuser D connected to the inflator 120 and outlets D2 of the diffuser D communicating with the inside of the airbag cushion 110. The outlets D2 of the diffuser D are arranged to face opposite sides of the airbag cushion 110.

It is very important that the airbag cushion 110 is expanded uniformly in order for the airbag cushion 110 to fill a gap between the pedestrian and the vehicle. Gas expanding the airbag cushion 110 is very high pressure, so the diffuser D is needed to evenly distribute the pressure.

The inlet D1 of the diffuser D is connected to the inflator 120 and the outlets D2 are connected to the airbag cushion 110, so that the diffuser D may assist gas generated from the inflator 120 to be supplied to the airbag cushion 110. In particular, in order for the gas to expand the A-pillar chamber AC at first, it is preferable to form the length in a width direction of the diffuser D longer than the length in a longitudinal direction of the diffuser D. In the above case, the airbag cushion 110 is expanded to expand the A-pillar chamber AC at first, so that it is possible to prevent preferentially the pedestrian from colliding with the A-pillar chamber AC that is stiffer than the windshield glass W.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A pedestrian airbag comprising:
   an airbag cushion stored in a folded state in a pedestrian airbag room located between a roof and a headliner of a vehicle, and configured to be deployed to entirely cover both a windshield glass and an A-pillar by being expanded during deployment thereof, wherein the airbag cushion is configured such that a portion thereof corresponding to the windshield glass constitutes a windshield glass chamber and a portion thereof corresponding to the A-pillar constitutes an A-pillar chamber and a thickness of the windshield glass chamber and a thickness of the A-pillar chamber are different from each other;
   a cover coupled to the roof by hinging at a portion where the roof extended forward is bent in a direction of the windshield glass, the cover further configured to lift, responsive to an expansive force of the airbag cushion when the airbag cushion is expanded, and thereby open an airbag cushion room in contact with the headliner; and
   an inflator configured to supply gas to the airbag cushion, wherein, during deployment, the inflator supplies gas to the A-pillar chamber before the windshield glass chamber.

2. The pedestrian airbag of claim 1, wherein the thickness of the A-pillar chamber is thicker than the thickness of the windshield glass chamber.

3. The pedestrian airbag of claim 1, wherein the airbag cushion is stored in a roll-folding method in which the airbag cushion is rolled in a direction toward the windshield glass.

4. The pedestrian airbag of claim 1, wherein the airbag cushion is stored such that a portion thereof is rolled in a roll-folding method in a direction toward the windshield glass and a remaining portion thereof is folded in a zigzag-folding method.

5. The pedestrian airbag of claim 1, wherein a cover is provided at the roof, the cover being configured to cover the folded airbag cushion and to guide a deployment direction of the airbag cushion during the deployment of the airbag cushion.

6. A pedestrian airbag comprising:
   an airbag cushion stored in a folded state in a pedestrian airbag room located between a roof and a headliner of a vehicle, and configured to be deployed to entirely cover both a windshield glass and an A-pillar by being expanded during deployment thereof;
   a cover coupled to the roof by hinging at a portion where the roof extended forward is bent in a direction of a windshield, the cover further configured to lift, responsive to an expansive force of the airbag cushion when the airbag cushion is expanded, and thereby open an airbag cushion room in contact with the headliner; and
   an inflator configured to supply gas to the airbag cushion, wherein, during deployment, the inflator supplies gas to an A-pillar chamber before a windshield glass chamber,
   wherein a diffuser is provided at an upper portion of the airbag cushion, and has an inlet connected to the inflator and outlets communicating with an inside of the airbag cushion, the outlets of the diffuser being arranged to face opposite sides of the airbag cushion.

7. The pedestrian airbag of claim 6, wherein the diffuser is provided at a center portion of the upper portion of the airbag cushion.

* * * * *